UNITED STATES PATENT OFFICE.

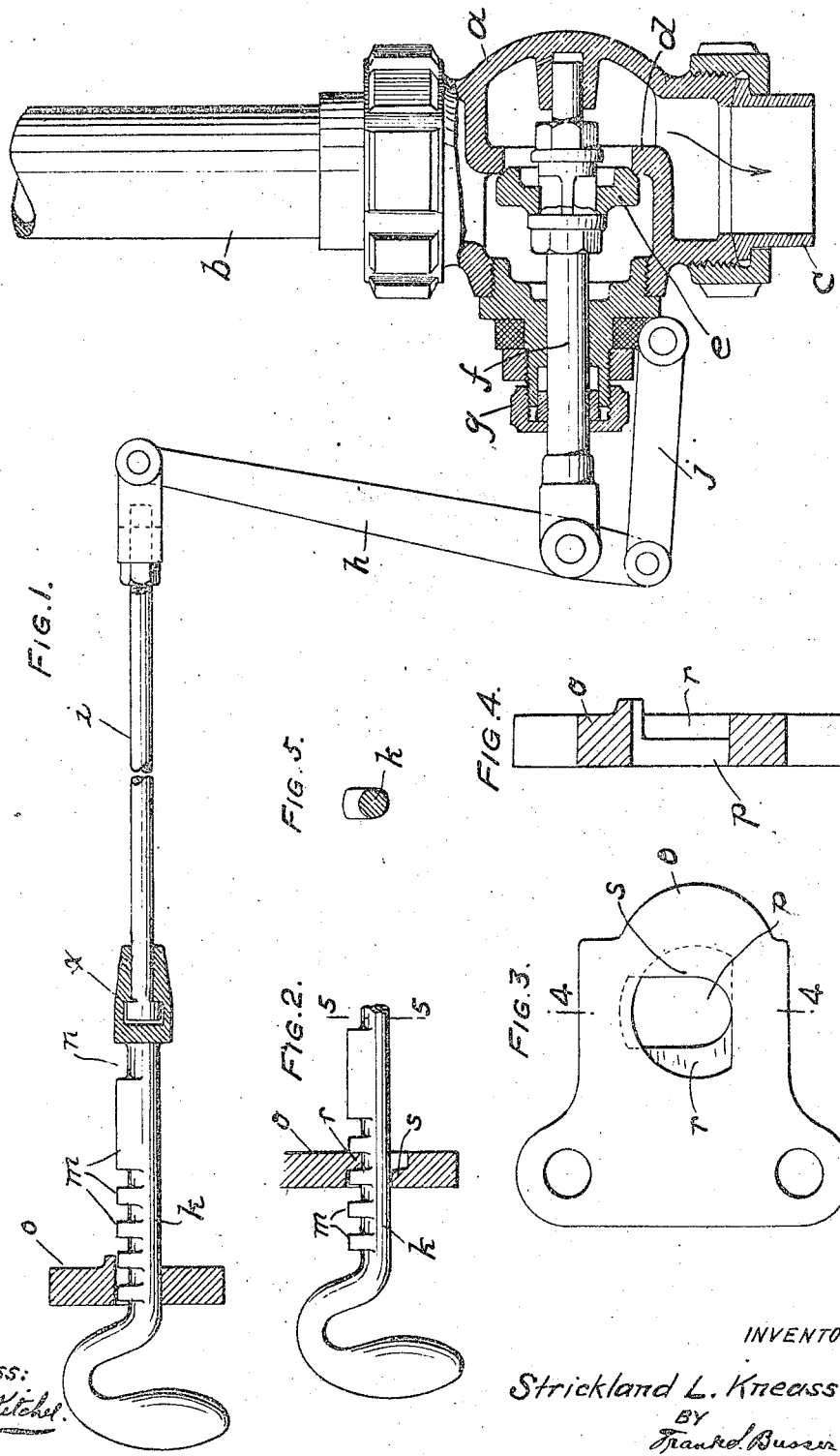

STRICKLAND L. KNEASS, OF PHILADELPHIA, PENNSYLVANIA, ASSIGNOR TO WILLIAM SELLERS & COMPANY, INC., OF PHILADELPHIA, PENNSYLVANIA, A CORPORATION OF PENNSYLVANIA.

VALVE OPERATING AND LOCKING MECHANISM.

1,379,927.   Specification of Letters Patent.   Patented May 31, 1921.

Application filed November 15, 1919. Serial No. 338,316.

*To all whom it may concern:*

Be it known that I, STRICKLAND L. KNEASS, a citizen of the United States, residing at Philadelphia, county of Philadelphia, and State of Pennsylvania, have invented a new and useful Improvement in Valve Operating and Locking Mechanism, of which the following is a full, clear, and exact description, reference being had to the accompanying drawings, which form a part of this specification.

In the operation of valves used in connection with non-lifting injectors on locomotive boilers, as well as in valves used for analogous and other purposes, means have been provided to hold the valve open or closed and in intermediate position to govern the amount of steam admitted through the valve. The object of my invention is to provide a novel means for manually opening and closing the valve and bringing it to one of a considerable number of intermediate positions and then locking it in the position to which it is moved without the use of latches, springs or quadrant. It is customary, in locomotive construction, to operate the injector-steam-controlling valve by means of a lever forming part of the valve mechanism, said lever carrying a latch engageable with a quadrant. This lever is often necessarily located outside the cab,—a position inconvenient for operation by the engineer from the cab seat. Moreover the latched lever and quadrant construction can not, as a practical matter, be adapted to effect a locking of the valve in any considerable number of open positions. By means of my invention, not only may the valve be moved to, and held in, any one of a considerable number of open positions, but the valve may be manipulated from any convenient point, however relatively distant.

A preferred embodiment of the invention is shown in the drawings, it being understood that the valve *per se* embodies no element of novelty.

Figure 1 is a side elevation, partly in section, showing my invention connected with a valve, the locking plate being shown in cross-section.

Fig. 2 is a plan view of a part of the construction of Fig. 1, the handle end of the valve moving and locking rod being shown as having been drawn toward the operator, partly opening the valve and given a quarter turn from the position shown in Fig. 1.

Fig. 3 is a detail face view of the locking plate, enlarged.

Fig. 4 is a detail view of the locking plate in cross-section, the view being an enlargement of a similar view of the plate in Fig. 1 and being taken on the line 4—4 of Fig. 3.

Fig. 5 is a cross-section through the handle of the valve-operating rod on the line 5—5 of Fig. 2.

A typical valve casing $a$ is connected at opposite open ends with pipe sections $b$, $c$, and is divided by a web $d$ having an opening on which the valve $e$ is adapted to seat. The valve stem $f$ is shown as extending through a stuffing box $g$ secured to the valve casing. The valve shown is one that tends to close under steam pressure, but the invention hereinafter described may be readily adapted to a valve of any other type, whether the same controls the operation of a locomotive boiler injector, or be intended for some other use, or whether it tends to open or close by steam pressure.

The outer end of the valve stem $f$ is attached to a lever $h$ near one end thereof. The short end of the lever is connected by a link $j$ with the valve casing. To the long end of the lever is adjustably attached one end of an extension rod $i$. A handle $k$, the shank of which is practically a part of the rod $i$, has a swiveled connection therewith at $w$.

Bolted to a convenient support, as, for instance, the boiler, is a plate $o$ having a slot $p$ through which the handle $k$ is adapted to slide freely when the handle is in the position shown in Fig. 1, in which figure the plate $o$ is shown in vertical cross-section, while the handle is turned on its swivel so that the notches thereof open upward, practically fitting the slot.

From opposite side walls of the slot in plate $o$ project teeth $r$ and $s$. These two teeth are in staggered relation.

The handle $h$ has a cylindrical stem of slightly less diameter than that of the lower circular end of the slot $p$, and extends from the curved pull handle to the enlarged end $x$. Such a stem would freely open and close the valve if given the proper movement, but would not hold it in open position when subject to longitudinal stress. Upon this cylindrical stem is superimposed a series of projections or lands m of slightly smaller contour than that of the upper cross-section of the slot p and with less space between them than the thickness of the plate o. The adding of these lands or projections upon the cylindrical stem therefore causes no interference with the free and unimpeded movement forward or back in a longitudinal direction as long as the handle is maintained in the same plane as the longer axis of the slot p and normal to the plate o. By reason of the cylindrical section of the stem between lands, the handle is rotatable to the right or left when a notch or space between two adjacent lands, or the relatively distant notch n, registers with the corresponding tooth, r or s, in the plate o at the side of the slot p.

By drawing the handle (when it is turned into the position shown in Fig. 1) to the left until the notch n is in alinement with one of the teeth r or s, and then giving the handle a quarter turn, the valve e is held full open. By pushing the handle to the right until the valve is firmly seated and then giving the handle a quarter turn, the valve is held closed. By pushing or pulling the handle to any intermediate position in which a notch between two adjacent lands m alines with one of the teeth r or s and then giving it a quarter turn, the valve will be held open to a greater or less extent, dependent upon the particular notch of the handle that is engaged.

The amount of steam admitted to the valve may thus be closely regulated, there being about twice as many locking positions as there are projections or lands on the handle.

The valve-holding arrangement described exhibits obvious advantages over a quadrant and latched lever, such as is shown, for example, in the patent issued to me April 15, 1919, No. 1,300,280. While a number of notches are shown in this patent, it is hardly practicable, from an operative standpoint, to provide more than two or three, whereas in the present construction the number of locking positions may be made numerous enough to meet the most exacting requirements. Another advantage of the present construction is that the valve need not be operated from a point adjacent thereto, but may be manipulated from a relatively distant point.

It is desirable to have the distant notch n somewhat wider than the other notches, so the handle need not be accurately positioned when the valve is moved to a full open position preparatory to locking.

The device permits free and unimpeded movement for the opening and closing of the valve without passing through or over intermediate positions as indicated by notches and without compression of springs or manipulation of a latching mechanism.

The handle proper is so shaped that its weight is equally distributed on opposite sides of a plane through the axis of the handle. Thereby, when the handle is turned in one direction or the other, it will not tend, by its own unbalanced weight, to unlock itself.

Having now fully described my invention, what I claim and desire to protect by Letters Patent is:

1. In valve operating and locking mechanism, the combination with a valve, a valve actuating mechanism including a slidable and rotatable member adapted in its sliding movement to actuate the valve, said member having a series of notches, and a member having two teeth in different planes, one tooth being arranged to engage the notches when the member is turned in one direction while the other tooth is arranged to engage the notches when said member is turned in the other direction to lock said member from sliding longitudinally.

2. In valve operating and locking mechanism, the combination with a valve, of a slidable and turnable member, connections between the said member and the valve adapted, in the sliding movement of said member, to operate the valve, and a plurality of locking devices one of which is adapted to engage and lock said member when the latter is turned while in any one of a series of longitudinal positions and another of which is adapted to engage and lock said member when the latter is turned while in any one of a series of different longitudinal positions.

3. In valve operating and locking mechanism, the combination with a valve, of a slidable and turnable member, connections between the said member and the valve adapted, in the sliding movement of said member, to operate the valve, and a plurality of locking devices adapted, when said member is turned in different directions from its freely slidable position, to respectively engage said member and lock it from longitudinal movement, one locking device being positioned to engage said member when the latter is in any one of a series of longitudinal positions and the other locking device being positioned to engage said member when the latter is in any one of another series of longitudinal positions, the longitudinal positions of one series alternating with those of the other series.

4. In valve operating and locking mechanism, the combination with a valve, of a slidable and turnable member, connections between the said member and the valve adapted, in the sliding movement of said member, to operate the valve, and two locking devices, one of which is adapted to engage and lock said member when the latter is turned in one direction while in any one of a series of longitudinal positions, and the other of which is adapted to engage and lock said member when the latter is turned in an opposite direction while in any one of a series of different longitudinal positions alternating with the positions of the first series, said locking devices being positioned to be ineffective when said member is turned into an intermediate position.

5. In valve operating and locking mechanism, the combination with a valve, of a slidable and turnable member, connections between the said member and the valve adapted, in the sliding movement of said member, to operate the valve, said member having a series of notches, a toothed device having a plurality of teeth each of which is adapted to engage a notch in said member when said member is shifted to bring such notch into alinement with such tooth and then turned, said teeth being so positioned that the sliding of said member a distance equal to a fraction of the distance between adjacent notches will bring one of said notches into locking alinement with one or the other of said teeth.

6. In valve operating and locking mechanism, the combination with a valve, of a slidable and turnable member, connections between the said member and the valve adapted, in the sliding movement of said member, to operate the valve, an orifice plate, teeth projecting from opposite walls of said orifice, said teeth being in staggered relation, said member having a series of notches and being turnable a half turn on its axis to bring said notches in locking relation with one or the other of said teeth and being turnable into an intermediate unlocked position wherein it is free to slide longitudinally through said orifice.

7. In a valve operating and locking mechanism, the combination with a valve, of a slidable contrivance, connections between said contrivance and the valve adapted, in the sliding movement of said contrivance, to operate the valve, and a locking contrivance, one of said contrivances being turnable relatively to the other to effect a locking engagement between them, one of said contrivances comprising a plurality of locking members one of which performs the locking function when the slidable contrivance is in any one of a series of longitudinal positions while the other of which performs the locking function when the slidable contrivance is in any one of a series of longitudinal positions alternating with those of the first series.

8. In a valve operating and locking mechanism, the combination with a valve, of a slidable and turnable stem, connections between said stem and the valve adapted, in the sliding movement of the stem, to operate the valve, a plate having a slot with an arcuate portion, the stem having an arcuate contour adapted to the contour of the arcuate portion of the slot, a series of lands along one side of the stem forming between them notches of less width than the thickness of the plate, and teeth on the plate projecting into said slot and arranged at opposite sides thereof in staggered relation to each other.

In testimony of which invention I have hereunto set my hand, at Philadelphia, Pa., on this 14th day of November, 1919.

STRICKLAND L. KNEASS.